United States Patent [19]
Cullen et al.

[11] 3,916,299
[45] Oct. 28, 1975

[54] TEST SYSTEM FOR DETERMINING IONIZATION CURRENT OF GAS PANELS

[75] Inventors: Stephen L. Cullen, Fishkill; Gary F. Pavlovic, Beacon, both of N.Y.

[73] Assignee: International Business Machines Corporation, Armonk, N.Y.

[22] Filed: June 24, 1974

[21] Appl. No.: 482,177

[52] U.S. Cl. .................... 324/26; 324/27; 324/127
[51] Int. Cl.² ..................................... G01R 31/24
[58] Field of Search .............................. 324/24–27, 324/21, 127, 72

[56] References Cited
UNITED STATES PATENTS
2,560,952   7/1951   Herold ................................. 324/26

Primary Examiner—Alfred E. Smith
Assistant Examiner—Wm. H. Punter
Attorney, Agent, or Firm—Thomas F. Galvin

[57] ABSTRACT

A test system for measuring gas panel ionization current. The system features a capacitive current neutralizing circuit having two balanced branches, each branch including a winding and a capacitance, the capacitance in one branch being that of the gas panel cells. Only current due to gas panel ionization is detected. The windings preferably form the primary side of a differential transformer so that the ionization current may be detected in the secondary winding. Modifications of the basic circuit allow the measurement of the maximum sustain drive voltage (FIRST ON) as well as the minimum sustain voltage (FIRST OFF) of the display.

6 Claims, 5 Drawing Figures

3,916,299

TEST SYSTEM FOR DETERMINING IONIZATION CURRENT OF GAS PANELS

BACKGROUND OF THE INVENTION

1. Field of the Invention

This invention relates to the measurement of the voltage and current characteristics of gaseous cells, in particular gas panel display cells.

2. Description of the Prior Art

In the manufacture of gas panel display cells, it is necessary to test the cells with respect to specified current and voltage design parameters. The capacitive current drain in these cells is so high that it often masks the values of other design parameters from test equipment. For example, in the present equipment for testing gas panel ionization current and operating voltages, the ionization current is completely swamped by the capacitive current drain of the panel.

Consequently, at present these parameters are tested visually by operators who apply various potentials to the panel and observe the response of each cell to the input signals. The people who perform these tests must necessarily possess a high degree of skill, and where the panels are produced in large numbers, testing is quite expensive and time-consuming.

An alternative to operator visual testing is some form of automatic optical testing. However, no such system is presently economically feasible. In addition, an auxiliary computer would be required to maintain a record of the individual cells on the panel being tested.

Consequently, there is a need for some system for automatically testing the important design parameters of gas panel systems. To our knowledge, prior to the present invention, no such system has existed.

SUMMARY OF THE INVENTION

It is therefore an object of our invention to measure the critical design parameters of gas panel cells automatically.

It is a further object of our invention to do such testing with a reliable, relatively simple system, thereby insuring repeatability of the test for a large number of display units.

It is yet another object of our invention to perform such tests expeditiously and to yield an easily understandable read-out indicative of the success or failure of the display.

These and other objects of our invention are provided by means of a capacitive current neutralizing circuit having two balanced branches, each branch including a winding and a capacitance, the capacitance in one branch being that of the gas panel cells. When appropriate drive voltages are applied to the horizontal and vertical conductors of the display, the capacitive current drain of the panel is effectively nulled. When the drive voltages cause ionization of the panel, ionization current is drawn which is easily detected. The windings preferably form the primary side of a differential transformer so that the ionization current may be detected in the secondary winding.

The addition of appropriate circuitry at the output of the neutralizing circuit allows the measurement of the maximum and minimum sustain voltages of the gas panel.

DETAILED DESCRIPTION OF THE INVENTION

Figure 1:
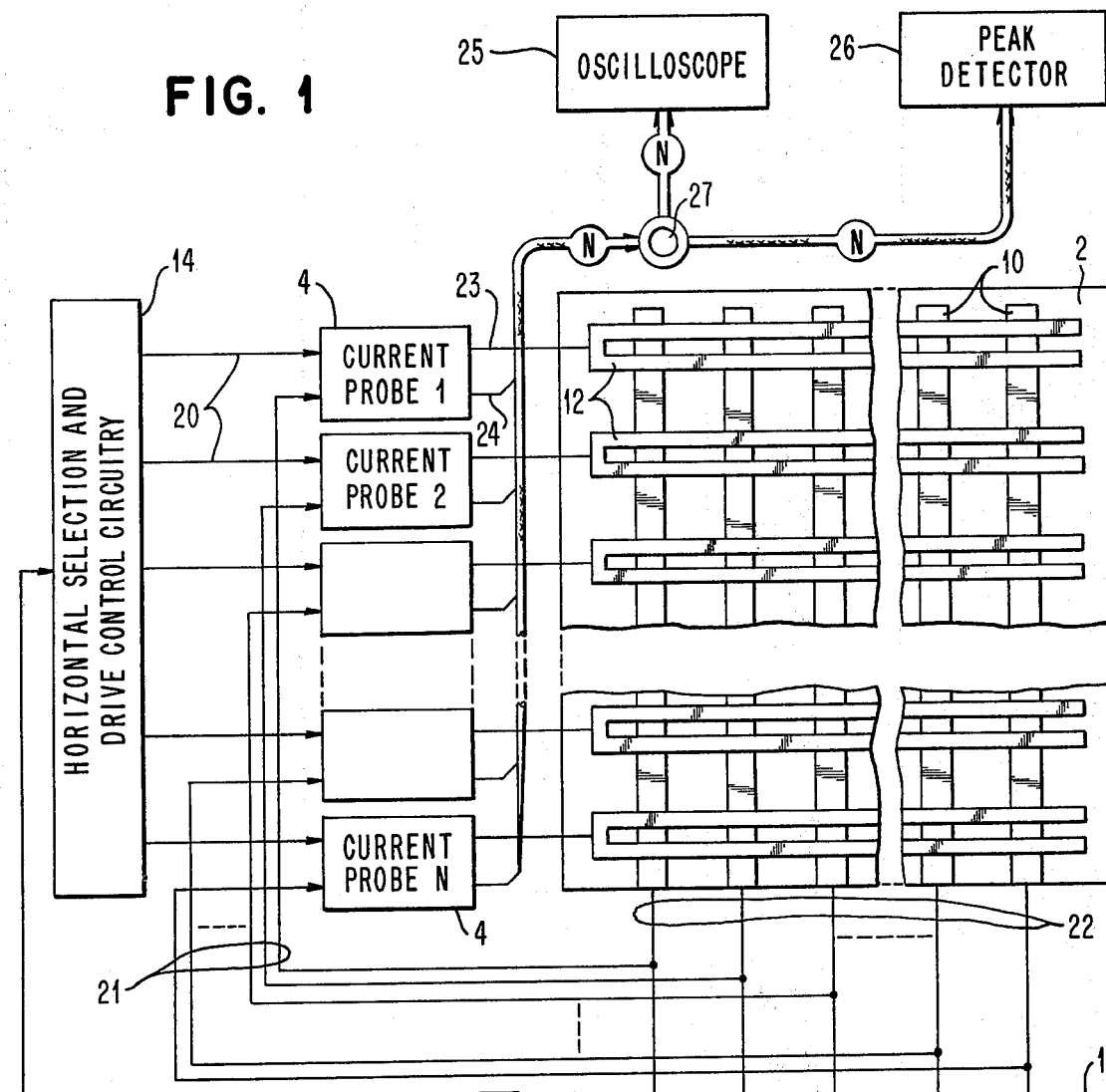
FIG. 1 is a schematic circuit diagram illustrating an embodiment of our invention for measuring the ionization current of a gas panel display system.

Referring now to FIG. 1, the standard gas panel is a rectangular matrix sharing a common gas chamber, of each gas cell being defined by the crossing of orthogonal conductors 10 and 12. In the illustrated embodiment of FIG. 1, the horizontal drive lines are shown as split conductors disposed on the upper surface of the panel, while the vertical drive conductors are disposed on the lower surface. Gas panel 2 includes an illuminable gas within a sealed envelope, and those regions within the vicinity of coordinate intersections of vertical and horizontal drive lines are designated gas cells. For a more complete description of gas panel apparatus, reference is made to U.S. Pat. No. 3,611,019 in the name of George M. Krembs and assigned to the assignee of the patent application.

The gas cells are selectively ignited or fired during a write operation by applying a first potential to associated horizontal drive line and the second potential to its associated vertical drive line of a magnitude such that the potential difference across the selected cell exceeds the ignition potential of the illuminable gas.

The geometrical and physical design of the gas panel may vary quite substantially and still come within the scope of our invention. Indeed, our invention is also applicable to individual gaseous discharge cells, although its advantages are not as effective.

The panel in FIG. 1 is a relatively recent type utilizing opaque metallic conductors and disclosed in a pending patent application, Ser. No. 209,235, in the name of P. H. Haberland et al., filed Dec. 17, 1971, now abandoned. In the embodiments illustrated in the Haberland et al. application, a unique conductor configuration is employed in which one of the conductor arrays comprises a set of two or more coplanar parallel conductor elements connected to a common drive line. The conductor elements in each set are spaced to permit radiant energy to pass there-between when a cell is selected. This is the type illustrated in FIG. 1 of our application as horizontal conductors 12. However, as previously mentioned, our invention is equally applicable to various other types of gas panel displays and to other variations which might occur to those of skill in the art.

The problem with which our invention is concerned is in the testing of the gas panels. For this purpose, we use circuit 4, termed a current probe, which is connected between the drive control circuitry and the gas panel. In FIG. 1, each current probe has inputs connected to the horizontal and vertical circuitry and an output line connected to an associated horizontal conductor.

The horizontal and vertical selection drive control circuitry, denoted by numerals 14 and 16, respectively, in FIG. 1 are by now quite standard in the art, having been described in the Krembs et al. application previously mentioned. The selection circuits are in the nature of decoders which address particular horizontal and vertical line drivers to select one or more cells in panel 2. The signals generated from circuitry 14 and 16 preferably take the form of square pulses. The amplitude of these pulses can be varied by means of driver power supply control circuit 17 which controls the value of the DC potential generated by driver power supply 18.

Each current probe 4 has a pair of input terminals for receiving the square pulses generated by circuitry 14 and 16 on cabling 20 and 21, respectively. One output terminal from the current probe is connected to an associated horizontal conductor which defines one row of display cells. A second output from the current probe is connected to the input terminals of oscilloscope 25 and peak detector 26 via a terminal block 27.

Figure 2:
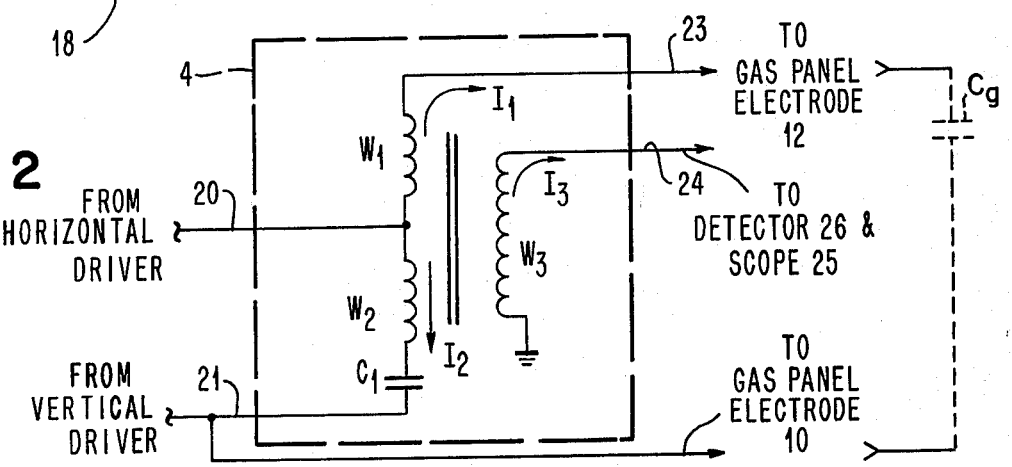
FIG. 2 is a more detailed schematic circuit diagram of the current probe shown in block diagram form in FIG. 1.

FIG. 2 illustrates the preferred embodiment of current probe circuit as comprising a transformer having a center-tapped primary winding and a secondary winding. Capacitor C1 is connected between winding W2 and line 21 from vertical selection circuitry 16. The outside terminal of winding W1 is connected by line 23 to gas panel 2. The output from secondary winding W3 is connected via line 24 to oscilloscope 25 and peak detector 26.

In conjunction with the capacitance, $C_g$, of the gas panel, current probe 4 functions as a means for neutralizing the gas panel capacitive current caused when either the horizontal or vertical drive circuits generate pulses. The capacitive current is neutralized prior to ionization of the gas between the selected cell. When the cell ionizes, the effective gas panel capacitance is reduced to, say, $C_g'$ and the circuit is no longer balanced. At that time a current impulse occurs which is the ionization current.

Figure 3:
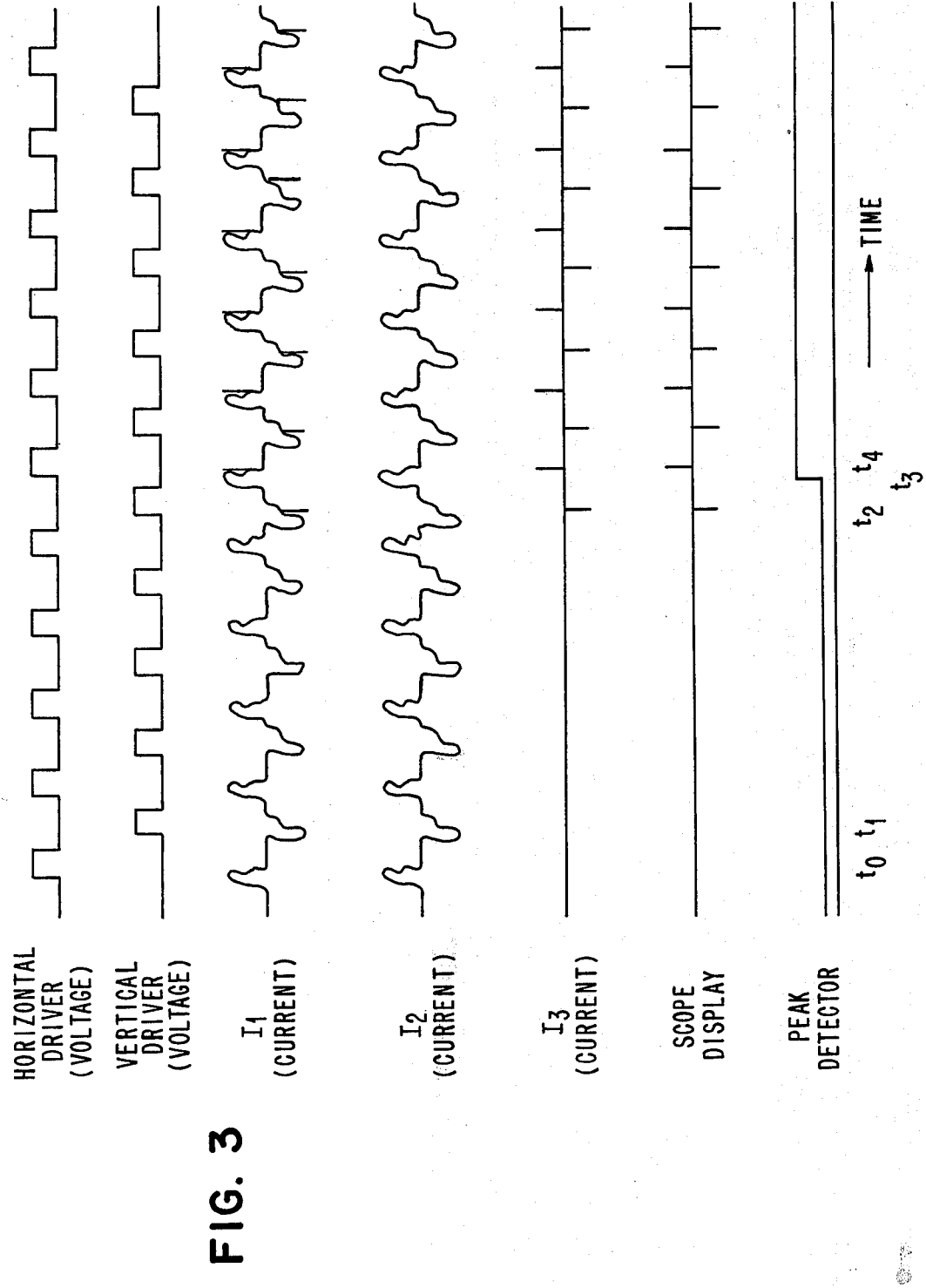
FIG. 3 is a timing diagram which illustrates the operation of the system of FIG. 1.

Basically, the combination of current probe 4 and the capacitance across the gas panel comprises two balanced reactive branches, each branch including an inductance and a capacitance. (Secondary winding W3 may be ignored at present.) One branch includes winding W2 and capacitor C1; the other branch includes winding W1 and the capacitance, $C_g$, of one row of gas cells. Preferably, the inductance values of W1 and W2 are equal, as are the capacitance values of C1 and $C_g$. When a drive voltage is impressed on the circuit from either the horizontal or vertical drivers, or both, the currents induced in the branches are equal and opposite, thereby canceling each other. Upon ionization of one or more cells, however, the effective capacitance of the cells is reduced from $C_g$ to $C_g'$. The branches are then unbalanced. A differential current, i.e., the ionization current, flows in the W1-$C_g$ branch. This current may be easily detected in any number of ways. We prefer the use of secondary winding W3 in conjunction with oscilloscope 25 and/or peak detector 26. FIG. 3 illustrates the operation of the system illustrated in FIGS. 1 and 2. The voltage pulses from the horizontal and vertical control circuitry are displaced in time so as to be out of phase with each other. This phase displacement is denoted in FIG. 3 as $t_0 - t_1$. The square wave pulse from the horizontal driver, which occurs first, generates current $I_1$ in winding W1 of current probe 4. The magnitude and shape of the current pulse is a function of the inductance of winding W1 and also of the capacitance between the vertical conductors and the particular horizontal conductor driven by the horizontal control circuitry, since each current probe drives a single horizontal conductor in the preferred embodiment.

At time $t_1$ the vertical pulse arrives from the vertical control circuitry 16. By virtue of the LC constant of winding W2 and capacitor C1, which has a value equal to the capacitance of the gas panel row, the current through winding W2, denoted as $I_2$, is the same as $I_1$ but opposite in sign. Because both currents $I_1$ and $I_2$ pass through the current probe in different directions, the output current $I_3$ of the current probe across winding W3 is zero. Thus, there is no indication on oscilloscope 25 or peak detector 26 of any electrical signal, even though the capacitance current flowing through the current probe is quite substantial.

By increasing the horizontal and vertical drive voltages on a selected display cell or cells, the gas within the cells ionizes. For testing purposes it is desirable to gradually increase the magnitude of the horizontal and vertical pulses in monotonic fashion to gradually reach the potential at which the cell will ionize. This variation of potential level can be easily accomplished through driver power supply control 17 in FIG. 1.

As shown in FIG. 3, ionization occurs at time $t_2$. At this point, the gas panel draws an additional, differential current $I_3$ which is induced in winding W3. This is the ionization current of the gas panel, which is the parameter desired to be measured. Current $I_3$ is also transmitted to peak detector 26 which generates a constant output voltage pulse having an amplitude which is related to the value of the peak of the ionization current. After ionization, each horizontal or vertical pulse causes ionization current to be drawn which appears as Current $I_3$ through W3 of current probe 4.

In the test system illustrated in FIG. 1, each horizontal conductor 12 has associated therewith a current probe of the type shown in FIG. 2. However, it is often more economical to utilize the same probe to test more than one row of cells. In this event, a multiplexing scheme whereby the same probe tests more than one row of cells on a time-shared basis could be practiced merely by utilizing a multiplexing tree on lines 23 between current probes and the gas panel.

Figure 4:
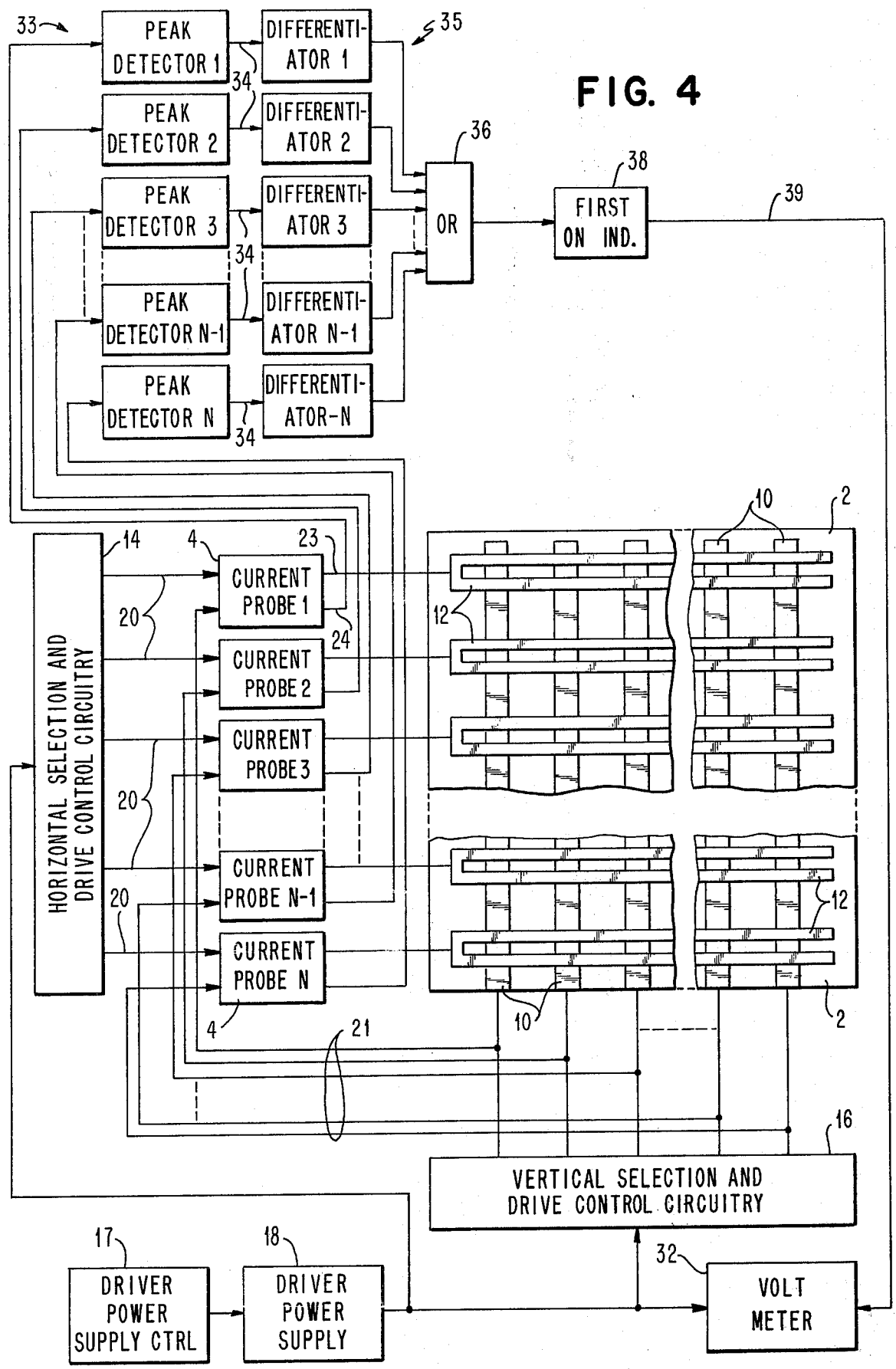
FIG. 4 illustrates a modification of the circuit in FIG. 1 for determining the maximum sustain voltage of a gas panel.

FIG. 4 illustrates an embodiment of our invention whereby the "FIRST-ON" (maximum sustain) voltage level can be made on a gas panel. The maximum sustain level is that at which one of the cells in an array is ignited. The circuit of FIG. 4 contains special mating circuits so that the stimulus drive voltage which must be supplied to a gas panel in order to ignite the first cell can be measured. The mating circuits include peak detectors 33 and associated differentiators 34, one of which is connected to output line 24 of an associated current probe circuit. The outputs from differentiators 34 are gated to FIRST ON INDICATOR 38. The output from indicator 38 is transmitted to voltmeter 32 which provides an output indication of the FIRST ON voltage.

Peak detectors 33 are the same type as in FIG. 1. A circuit which has been found useful as a peak detector is that described in the publication by Philbrick Researchers, Inc. entitled, "Applications Manual for Computing Amplifiers," 1966, denoted as Circuit III.49 on page 87 thereof. The differentiators are also well known in the art. One well known type which we have used successfully comprises a silicon controlled rectifier (SCR) having a capacitor connected to the gate electrode, which is the input from the peak detector; the output is taken from the anode of the SCR. FIRST ON indicator 38 may be merely a lamp or other indicating device.

In operation, driver power supply control 17 controls power supply 18 so that the output voltages of horizontal and vertical selection circuitry are in the form of square pulses having a monotonically increasing amplitude. The initial pulses are of low voltage to insure that none of the cells in the array being tested are ignited. As the potentials of the pulses increase, one of the cells in panel 2 becomes ignited. This causes current to be generated in the secondary winding of current probe 4, say PROBE N-1, associated with the cell. This current is detected in peak detector N-1 which generates an output voltage pulse to differentiator N-1. The signal is transmitted through OR gate 36 and indicator 38 to voltmeter 32. This signal triggers the voltmeter to read the power supply voltage presently being transmitted to the gas cells through the selection circuitry. This value is the maximum sustain voltage level of the gas panel.

Figure 5:
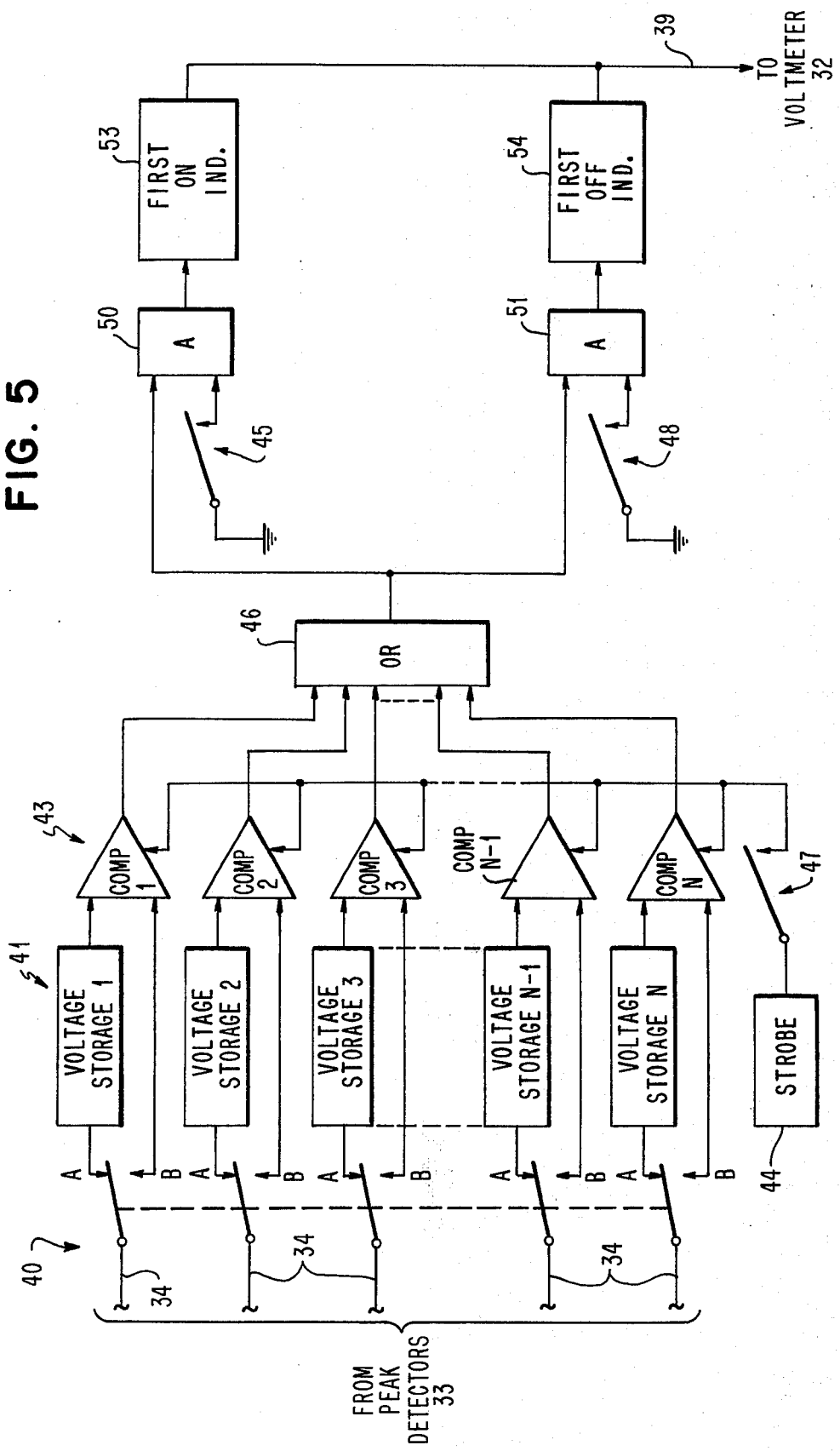
FIG. 5 is a modification of the circuit in FIG. 1 for determining both the maximum and minimum sustain voltages of a gas panel.

FIG. 5 illustrates a system for measuring both the maximum sustain voltage (FIRST ON) as well as the minimal sustain voltage (FIRST OFF) of the display panel. The system is generally that shown in FIG. 4 in that current probes 4, power supply control 17, power supply 18, voltmeter 32 and the peak detector 33 connections remain the same. However, differentiators 35, OR function block 36 and the FIRST ON indicator 38 are replaced by the circuitry shown in FIG. 5.

The circuit comprises a gang switch 40 having first contacts A connected to voltage storage devices 41 and second contacts B connected to voltage comparison circuits 43. The latter each have second input lines from the output line of its associated voltage storage device. Means 44 are provided for strobing comparators 43 in order to gate the potential values through OR gate 46 to a FIRST-ON indicator 53 or a FIRST-OFF indicator 54. Indicators 53 and 54 operate in mutually exclusive fashion and are controlled by switches 45 and 48 through gates 50 and 51, respectively. As with regard to the circuit of FIG. 4, an output from either of indicators 53 or 54 acts to signal voltmeter 32 to provide an indication of the driving voltage which causes the indicators to be activated.

Operation of the Circuit of FIG. 5.

In the case of a FIRST ON measurement, the drive voltage of power supply 18 is established through control 17 at a level above the ignition voltage of a cell, termed V1, but below the ignition voltage, such that no cell in panel 2 ignites.

Gang switch 40 is then momentarily switched to position A; and then switched to position B. At this point, the output of Peak Detectors 33 is stored in Voltage Storage 41. The power supply voltage is then increased to a value at which it can be assumed that a cell will ignite, termed V2. For a typical gas panel the initial voltage, V1, may be 85 volts; and the second voltage, V2, may be 95 volts. V2 is a value above the ignition voltage for at least some cells. At this point the power supply voltage is decreased to the original value V1, with switch 40 being at position B. Strobe 44 is then activated through switch 47 and the potentials stored at voltage storage blocks 41 and each compared with the outputs of peak detectors 33. If ionization has occurred in a cell or cells at the higher voltage, one of the Comparators 43 generates an output through OR gate 46 which is gated through gate 50 (relay 45 being set) to activate FIRST-ON indicator 53.

At this point it has been determined that potential V2 will ignite one or more cells. However, it is desired to determine the value of potential lying between V1 and V2 which will cause the least number of cells only in the entire panel to ignite, i.e., the FIRST-ON voltage. This value can be determined by momentarily deactivating the panel and repeating the steps just detailed with reduced values of potential below V2 until FIRST-ON indicator 53 is not activated. The lowest value of potential which produces a FIRST-ON indication is the maximum sustain voltage for the array of cells being tested.

It is important to select V1 at a level above the extinguish voltage but below the ignition voltage. If V1 were below the extinguish voltage and subsequently V2 ignited certain cells, the cells would turn off when the drive potential were returned to V1. No difference in potential for Peak Detector 33 would be noted and the test would show no indication of ignition even though some cells had actually ignited.

The operation of the circuit in FIG. 5 for measuring the minimum sustain voltage level (FIRST-OFF) of the gas panel under test is next described. For this test, switch 48 is closed and switch 45 is open. Power supply 18 is set to a voltage at which it can be assumed that all cells under test will be ignited, termed $V_{ON}$. $V_{ON}$ may be approximately 95 volts. With all cells ignited, the potential is then reduced below $V_{ON}$ to a potential at which all the dots will continue to be ionized, i.e., sustained. This potential value may be termed V3, approximately 90 volts. Gang switch 40 is momentarily placed in the A position and the voltage outputs from peak detectors 33 are stored in their associated Storage Blocks 41. Gang switch 40 is then switched to position B.

At this point the value of the power supply voltage is reduced to a value less than V3, denoted V4. The power supply voltage is then returned to value V3. Switch 47 is energized so that Strobe 44 gates Comparators 43. If the potential stored in any of the storage blocks 41 is greater than the potential in the associated peak detector after the change in voltage from V3 to V4 and back to V3, the associated COMP circuit 43 generates an output which activates FIRST-OFF indicator 54. This indication means that one or more cells on the panel become extinguished between the sustain voltage levels V4 and V3.

The above sequence is then repeated, but with increased values of V4 until FIRST-OUT indicator 54 is not activated by any of the COMP circuits 43. This last value of V4 for which Indicator 54 was activated is the FIRST-OUT voltage level for the array of cells being measured. This is the minimum sustain voltage level for the cells being tested.

If FIRST-OUT indicator 54 had not been activated when the cells were switched from V3 to V4 and back to V3, then the sequence would be repeated with a reduced value of V4.

While the invention has been particularly shown and described with reference to a preferred embodiment thereof, it will be understood by those skilled in the art of the foregoing and other changes in form and detail may be made therein without departing from the spirit and scope of the invention.

We claim:

1. A system for testing the ignition characteristics of a gas discharge cell comprising:
   means for applying potential energy across said cell sufficient to ionize the gas within the cell;
   means, connected to the output of said potential means for neutralizing the capacitive current of said cell, comprising a pair of balanced branches, each said branch including a winding and a capacitance, the capacitance in one of said branches being that of said gas discharge cell; and
   a third winding inductively coupled to said first pair of windings for detecting the ionization current of said cell.

2. A system as in claim 1 and further comprising:
   means connected to said third winding for measuring said ionization current.

3. A system as in claim 1 wherein said potential energy means comprises driver means connected across said pair of balanced branches.

4. A system for testing the cells of a gaseous discharge display panel which includes a gas-filled envelope, a first plurality of conductors disposed on one side of said envelope and a second plurality of conductors disposed on the opposite side thereof, the coordinate intersections of said first and second conductors defining said gaseous discharge cells, comprising:
   first and second means for supplying operating potentials to said first and second plurality of conductors, respectively; and
   means, connected to the output lines of said operating potential means for neutralizing the capacitive current of said panel, comprising a pair of balanced branches, each said branch including a winding and a capacitance, the capacitance in one of said branches being that of said cells; and
   a third winding inductively coupled to said first pair of windings for detecting the ionization current of said panel.

5. A system as in claim 4 and further comprising:
   means connected to said third winding for measuring said ionization current.

6. A system as in claim 4 where said operating potential means include two output lines connected across said pair of balanced branches.

* * * * *

UNITED STATES PATENT OFFICE
CERTIFICATE OF CORRECTION

PATENT NO. : 3,916,299
DATED : October 28, 1975
INVENTOR(S) : Stephen L. Cullen
Gary F. Pavlovic It is certified that error appears in the above-identified patent and that said Letters Patent are hereby corrected as shown below:

Column 5, Line 56     after "above the" delete "ignition" and insert --extinguish--

Signed and Sealed this tenth Day of February 1976

[SEAL]

Attest:

RUTH C. MASON
*Attesting Officer*

C. MARSHALL DANN
*Commissioner of Patents and Trademarks*